US008645960B2

(12) United States Patent
Yuen et al.

(10) Patent No.: US 8,645,960 B2
(45) Date of Patent: Feb. 4, 2014

(54) METHOD AND APPARATUS FOR DATA PROCESSING USING QUEUING

(75) Inventors: John (Chun Fung) Yuen, Mississauga (CA); Zhe Li, Mississauga (CA)

(73) Assignee: Redknee Inc., Mississauga (CA)

( * ) Notice: Subject to any disclaimer, the term of this patent is extended or adjusted under 35 U.S.C. 154(b) by 1433 days.

(21) Appl. No.: 11/781,820

(22) Filed: Jul. 23, 2007

(65) Prior Publication Data
US 2009/0031306 A1   Jan. 29, 2009

(51) Int. Cl.
*G06F 9/46*   (2006.01)
(52) U.S. Cl.
USPC ............ 718/102; 718/105; 370/230; 370/235
(58) Field of Classification Search
None
See application file for complete search history.

(56) References Cited

U.S. PATENT DOCUMENTS

| 5,555,241 | A  | * | 9/1996 | Lazaridis et al. | ............ 370/389 |
|-----------|----|---|--------|------------------|----------------------|
| 5,638,448 | A  | * | 6/1997 | Nguyen | ......................... 380/29 |
| 5,721,914 | A  | * | 2/1998 | DeVries | ................................ 1/1 |
| 6,201,789 | B1 | * | 3/2001 | Witkowski et al. | ........... 370/230 |
| 6,240,140 | B1 | * | 5/2001 | Lindbergh et al. | ............ 375/260 |
| 6,862,282 | B1 | * | 3/2005 | Oden | ........................... 370/394 |
| 7,020,143 | B2 | * | 3/2006 | Zdan | ....................... 370/395.21 |
| 7,206,857 | B1 | * | 4/2007 | Mammen et al. | ............. 709/238 |
| 7,339,943 | B1 | * | 3/2008 | Mammen et al. | ............. 370/414 |
| 7,362,749 | B2 | * | 4/2008 | Bishard | ......................... 370/357 |
| 7,512,780 | B1 | * | 3/2009 | Milliken | ....................... 713/153 |
| 7,562,364 | B2 | * | 7/2009 | Sanjay | .......................... 718/103 |
| 7,590,058 | B1 | * | 9/2009 | Cherchali et al. | ............. 370/230 |
| 2002/0016858 | A1 | * | 2/2002 | Sawada et al. | ................ 709/238 |
| 2002/0049899 | A1 | * | 4/2002 | Kenworthy | ...................... 713/1 |
| 2002/0065865 | A1 | * | 5/2002 | Gilbert | ........................... 709/102 |
| 2002/0078206 | A1 | * | 6/2002 | Boies et al. | ................... 709/226 |
| 2002/0101876 | A1 |   | 8/2002 | Sonnier |  |
| 2002/0126631 | A1 | * | 9/2002 | Lee | ............................... 370/328 |
| 2002/0157090 | A1 | * | 10/2002 | Anton, Jr. | ..................... 717/178 |
| 2003/0067878 | A1 | * | 4/2003 | Zboril | ........................... 370/235 |
| 2003/0069920 | A1 | * | 4/2003 | Melvin et al. | ................. 709/108 |
| 2003/0088721 | A1 | * | 5/2003 | Sharma | ......................... 710/112 |
| 2003/0204600 | A1 | * | 10/2003 | Stoner et al. | .................. 709/227 |
| 2004/0120293 | A1 | * | 6/2004 | Hassan et al. | ................. 370/338 |
| 2004/0246980 | A1 |   | 12/2004 | Balakrishnan et al. |  |
| 2005/0213585 | A1 | * | 9/2005 | Sturm et al. | ............. 370/395.31 |

(Continued)

OTHER PUBLICATIONS

International Search Report of PCT/CA2008/001329 dated Feb. 5, 2009.

(Continued)

*Primary Examiner* — Emerson Puente
*Assistant Examiner* — Hiren Patel
(74) *Attorney, Agent, or Firm* — Perry + Currier Inc.; Kristjan Spence

(57) ABSTRACT

A computing device is provided having a central processing unit, random access memory, and read only memory interconnected by a bus. The central processing unit is configured to execute a plurality of programming instructions representing a plurality of software objects. The software objects comprise a read queue for storing unprocessed packets and a write queue for storing processed packets. The software objects include a reader thread for reading packets from the read queue and a lock free queue for receiving packets received via the reader thread. The software objects also include at least one processor thread for performing an operation on the packets in the lock free queue. The software objects include a writer thread for writing packets that have been processed by the at least one processor thread to the write queue.

2 Claims, 5 Drawing Sheets

(56) References Cited

U.S. PATENT DOCUMENTS

| | | | |
|---|---|---|---|
| 2006/0171318 A1 | 8/2006 | Bergamasco et al. | |
| 2006/0198349 A1* | 9/2006 | Ng et al. | 370/338 |
| 2007/0110011 A1* | 5/2007 | Nelson | 370/338 |
| 2007/0121499 A1 | 5/2007 | Pal et al. | |
| 2007/0127480 A1* | 6/2007 | Chen et al. | 370/392 |
| 2007/0230445 A1* | 10/2007 | Barrie et al. | 370/352 |
| 2008/0066066 A1* | 3/2008 | MacPherson | 718/100 |

OTHER PUBLICATIONS

Qie X et al: "Scheduling computations on a software-based router" Performance Evaluation Review, Association for Computing Machinery, New York, NY, US LNKD-DOI:10.1145/384268. 378425, vol. 29, No. 1, Jun. 16, 2001, pp. 13-24, XP002299759 ISSN: 0163-5999; * sections 1, 2.1figures 1-3; table 1*.

European Patent Application No. 08783243.2 Search Report dated Jul. 1, 2010.

* cited by examiner

US 8,645,960 B2

METHOD AND APPARATUS FOR DATA PROCESSING USING QUEUING

FIELD

The present specification relates generally to computer data processing and more particularly relates to a method and apparatus for data processing using queuing.

BACKGROUND

There is an increasing need for real-time processing. (As used herein, the term "real-time" is also intended to refer to near real-time and substantially real-time.) This need is well illustrated in the telecommunications sector where real-time services are ubiquitous. The classic example of a real-time service is traditional voice telephony services, however, as portable wireless communication devices become more powerful, demand is arising for streaming video, audio and other real-time services.

In telecommunications, concurrent with the demand for real-time services is the demand for real-time billing, which is particularly important in the case of pre-paid services, although is also relevant to post-paid services. Invocation and performance of a real-time service must also take place concurrent with real-time management of a subscriber's balance. Accordingly, improvements are needed to current data queuing techniques to satisfy such demand, or at least improve satisfaction of such demand.

SUMMARY

A computing device is provided having a central processing unit, random access memory, and read only memory interconnected by a bus. The central processing unit is configured to execute a plurality of programming instructions representing a plurality of software objects. The software objects comprise a read queue for storing unprocessed packets and a write queue for storing processed packets. The software objects include a reader thread for reading packets from the read queue and a lock free queue for receiving packets received via the reader thread. The software objects also include at least one processor thread for performing an operation on the packets in the lock free queue. The software objects include a writer thread for writing packets that have been processed by the at least one processor thread to the write queue.

DETAILED DESCRIPTION OF THE EMBODIMENTS

Figure 1:
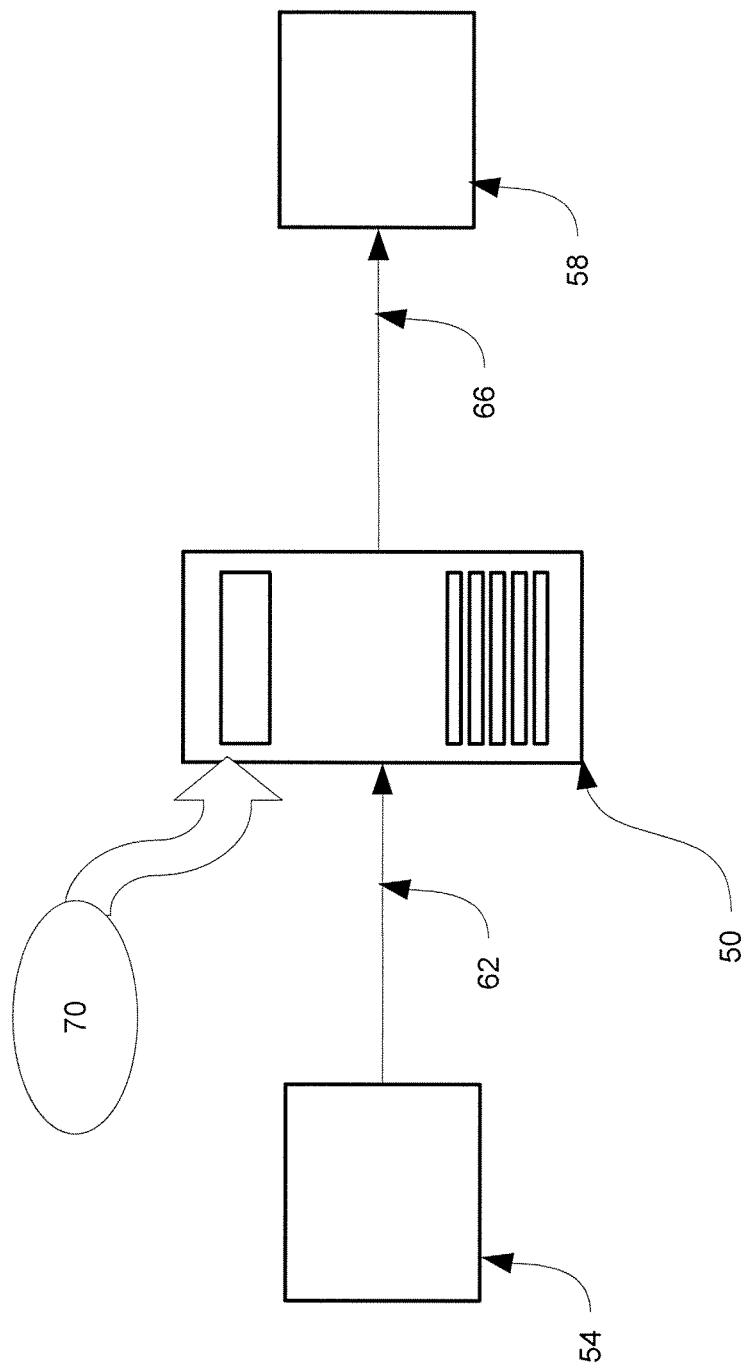
FIG. 1 shows an apparatus for data processing using queuing.

Referring now to FIG. 1, an apparatus for data processing is indicated generally at 50. In a present embodiment, apparatus 50 is a server, although in other embodiments apparatus 50 can be based on other types of computing environment. Apparatus 50 is typically a computing device such as a server having a keyboard and mouse (or other input devices), a monitor (or other output device) and a desktop-module connecting the keyboard, mouse and monitor and housing one or more central processing units, volatile memory (i.e., random access memory), persistent memory (i.e., hard disk devices) and network interfaces to allow the apparatus 50 to communicate over a network. For example, apparatus 50 can be a Sun 480R server from Sun Microsystems, Inc. of Palo Alto Calif., with a plurality of CPUs and, because a significant portion of processing is performed in random access memory, such a server could be configured with about eight to about sixteen gigabytes of random access memory. However, it is to be emphasized that this particular server is merely exemplary, a vast array of other types of computing environments for apparatus 50 are within the scope of the invention.

Apparatus 50 is situated between a data source 54 and a data destination 58. Thus, apparatus 50 connects to data source 54 via a first link 62 and to data destination 58 via a second link 66. Links 62 and 66 connect to apparatus 50 via one or more network interfaces within apparatus 50. Links 62 and 66 are shown separately for convenience and can, in fact, be on the same physical and/or data link and/or network topology as desired.

Data source 54 can be any source of data packets that are supplied to apparatus 50, while data destination 58 can be any destination of data packets to which data packets from data source 54 are ultimately addressed or destined. Indeed, data source 54 can represent a plurality of data sources while data destination 58 can represent a plurality of data destinations. Data source 54 and data destination 58 themselves are typically based on computing hardware infrastructure, such as a server or a router or any other network component or the like.

Apparatus 50 is configured to execute a software application 70 that can process packets originating from data source 54 en route to data destination 58. As used in the previous sentence, the term "process" is not intended to be limiting, and can refer to any type of operation or algorithm or the like that may be performed on such packets. One specific but non-limiting example of processing is analysis of packets being carried through a telecommunication network. For example, packets from data source 54 can include packets that contain a request for services from a mobile handset (not shown) connected to data source 54, where the services that are being requested by the mobile handset can be located at an application server (not shown) connected to data destination 58. Apparatus 50 can be incorporated into the infrastructure of the telecommunication network and configured to determine whether the packet request is authorized and/or otherwise conforms to the agreement between the subscriber operating the mobile handset and the carrier operating the telecommunication network to which the mobile handset connects. In a present embodiment, as part of its function in processing packets, application 70 is thus configured to "drop" packets that originate from data source 54 which are not authorized and to "forward" packets that originate from data source 54 which are authorized on to data destination 58.

Figure 2:
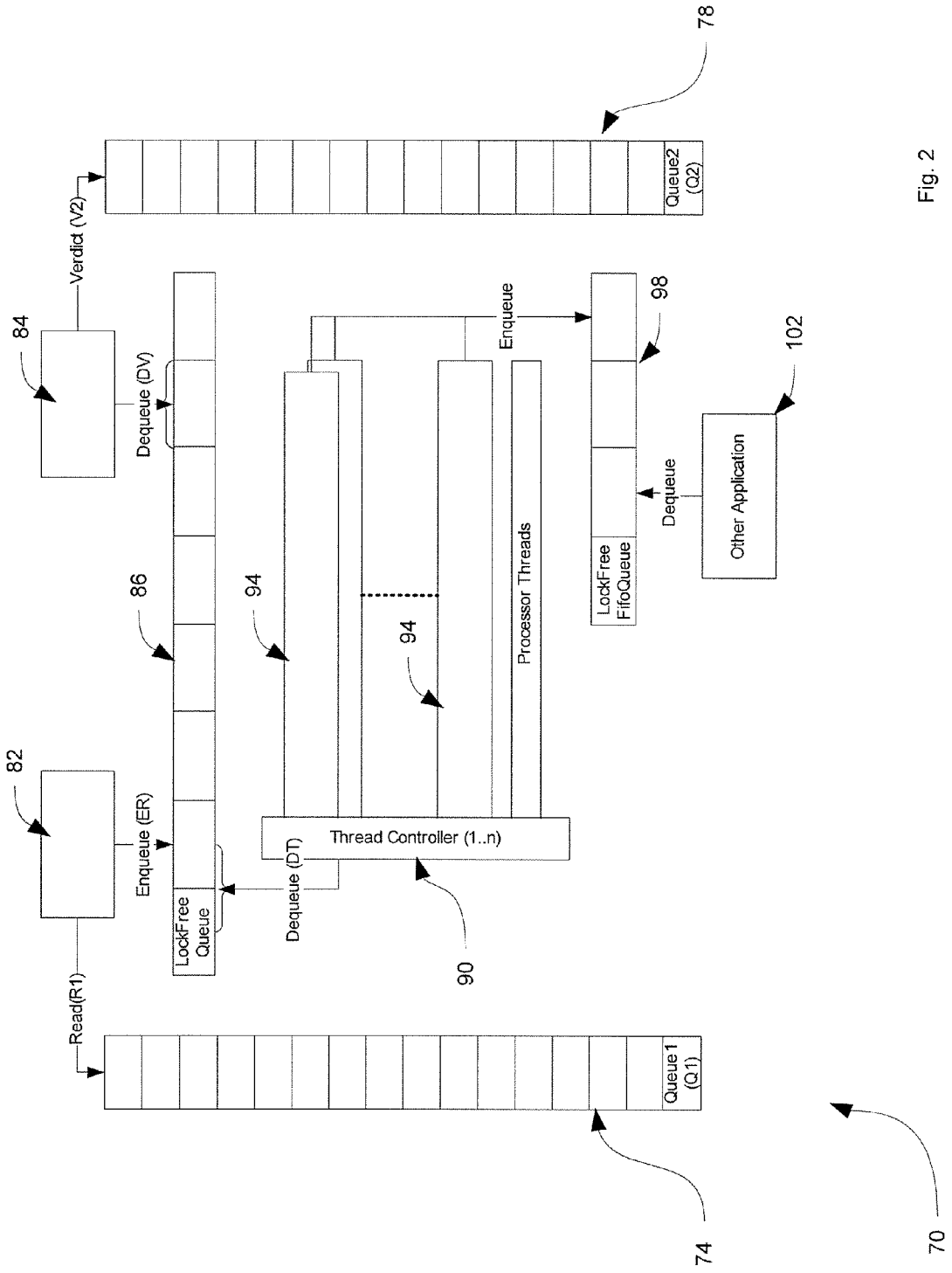
FIG. 2 shows a schematic representation of software executing on the apparatus of FIG. 1.

FIG. 2 shows a schematic representation of application 70. Application 70, as shown in FIG. 2, makes use of hardware within and/or other software executing on apparatus 50 in order to fulfill its function. Application 70 thus includes an input queue 74 and an output queue 78. Input queue 74 is associated with data source 54 and thus data packets from data source 54 populate input queue 74 on a first-in-first-out ("FIFO") (or other desired) basis. Likewise, output queue 78 is associated with data destination 58 and thus data packets that pass through application 70 and placed into output queue 78 with a "forward" flag are passed from output queue 78 to data destination 58, but those data packets that pass through application 70 and are placed into output queue 78 with a "drop" flag never exit from output queue 78 to data destination 58. Such packets with the "drop" flag may be stored for subsequent analysis, or used to generate an error message for the mobile handset that sent the dropped packet, or used for some other purpose, and/or those packets can be deleted altogether.

The components of application 70 that lie between queues 74 and 78 perform the processing function of marking packets with either a "forward" flag or "drop" flag. Such components of application 70 include a reader thread 82 and a writer thread 84. Reader thread 82 is configured to read data packets from queue 74 and enqueue those packets within an intermediate queue 86. Writer thread 84 is configured to read packets from queue 86 that have been processed and write them to queue 78.

Application 70 also includes a thread controller 90 which is configured to access queue 86 and to coordinate the processing of packets within queue 86 with a plurality of processor threads 94.

Each processor thread is in turn configured to coordinate with a FIFO queue 98 which is a memory mapped lockfree queue used by external application to do post processing of packets. In turn, FIFO queue 98 is accessible to another application 102 that can access FIFO queue 98 and perform operations on packets stored therein. Application 102 can be configured to do further processing but is not necessary. Threads 94 are configured to both dequeue from queue 86 and enqueue into queue 98. In other embodiments, application 102 and queue 98 can be omitted altogether depending on the desired functionality of apparatus 50.

Explaining application 70 in greater detail, queue 86 is a pre-allocated memory buffer. Indices comprised of a plurality of variables is associated with queue 86, referred to herein as TAIL, WRITHEAD and PROCHEAD are used to enqueue and dequeue data from queue 86. TAIL is controlled by reader thread 82. WRITHEAD is controlled by writer thread 84. PROCHEAD is controlled by thread controller 90 in conjunction with a particular thread 94.

(Note that, hereafter, where the term "HEAD" is used herein, it is used to refer to either WRITHEAD or PROCHEAD as the context requires.)

The size of queue 86 is selected to correspond with queues 74 and 78. (For example, each element can be aligned with the same size. (i.e., whereby the closest 2^n>=maxsize(element size). The use of a fixed size that is aligned with 2^n can improve overall efficiency and performance when the pointer for HEAD and TAIL is moved). As used herein, the term "element" refers to one block of memory with fixed size in a queue, whereas a packet is the content of an element.

TAIL is the last index used to enqueue elements in queue 86. WRITHEAD and PROCHEAD are the last index used to dequeue elements from a different processor thread 94. It is presently preferred that only one of the threads 94 should be enqueuing at any given time, and only two of threads 94 should be dequeuing at the same time at any given time.

Conceptually, TAIL, and HEAD are only able to move forward but never go back. However, since size of queue 86 is limited, when TAIL, and HEAD hit the limitation of queue 86, they will be rolled over to zero. When comparing the value of tail and head, the value is adjusted according to the following:

i) To check if queue 86 is full the following conditions are used: if (tail-head+1)==0; ==queue→maxsize; ==-queue→maxsize, then queue 86 is full.

ii) To check if queue 86 is empty the following conditions are used: (tail-head)==0; ==queue→maxsize; ==queue→maxsize, then queue 86 is empty.

Enqueueing into queue 86 by reader thread 82 is performed as follows:

If WRITHEAD or PROCHEAD is greater or equal than TAIL, then queue 86 is full. A message indicating that queue 86 is FULL is returned immediately.

If WRITHEAD or PROCHEAD is less than TAIL, the element will be enqueued by copying data from queue 74 to queue 86 and TAIL will be moved forward.

Enqueuing into queue 86 can be performed by reservation, whereby "reservation" refers to the fact that in order to read packets from 74, a memory block needs to be provided to store packets, but it is not desirable to allocate a temporary memory block when a packet is read from queue 74. Accordingly, memory is used directly from queue 86, and before that memory is used, that memory is "reserved" so that it is declared that the reserved memory block will be reserved so that other threads should not use that "reserved" memory block at all. After packets are read, these reserved memory blocks are "committed" and the tail index is moved forward, and the "reservation" can be cancelled so that those memory blocks can be ready to be used by other threads. "Reservation" can be performed as follows:

If WRITHEAD or PROCHEAD is greater or equal than TAIL, it means the queue is full. A message indicating that queue 86 is FULL is returned immediately.

If WRITHEAD or PROCHEAD is less than TAIL, then the pointer of current TAIL index for queue 86 will be returned. There is no memory copying or memory allocation.

When a block of queue 86 is filled with data, a method should be called to move TAIL forward.

Dequeuing from queue 86 is performed as follows:

Dequeue function using WRITHEAD or PROCHEAD is the same except each use a different HEAD pointer to dequeue data.

1. If TAIL is equal to HEAD, it means queue is empty. In this circumstance the dequeue function return NULL immediately.

2. If TAIL is greater than HEAD, it means queue is not empty. The element referenced by the HEAD index will be removed and HEAD will move forward by 1.

Dequeing a batch of packets from queue 86 is performed as follows:

1. If TAIL is equal to HEAD, it means queue is empty. In the circumstance the dequeue returns NULL immediately.

2. If TAIL is greater than HEAD, it means queue is not empty. The rest of elements in queue which is calculated by the equation TAIL−HEAD, and the pointer of current HEAD index will be returned. The numbers of available elements will be also returned. The numbers of available elements depends on minimum value between TAIL−HEAD and batch size.

3. After elements are dequeued and data are copied to other memory for processing, DequeueConfirm should be called to move head forward (HEAD=HEAD+AVAIL).

Figure 3:
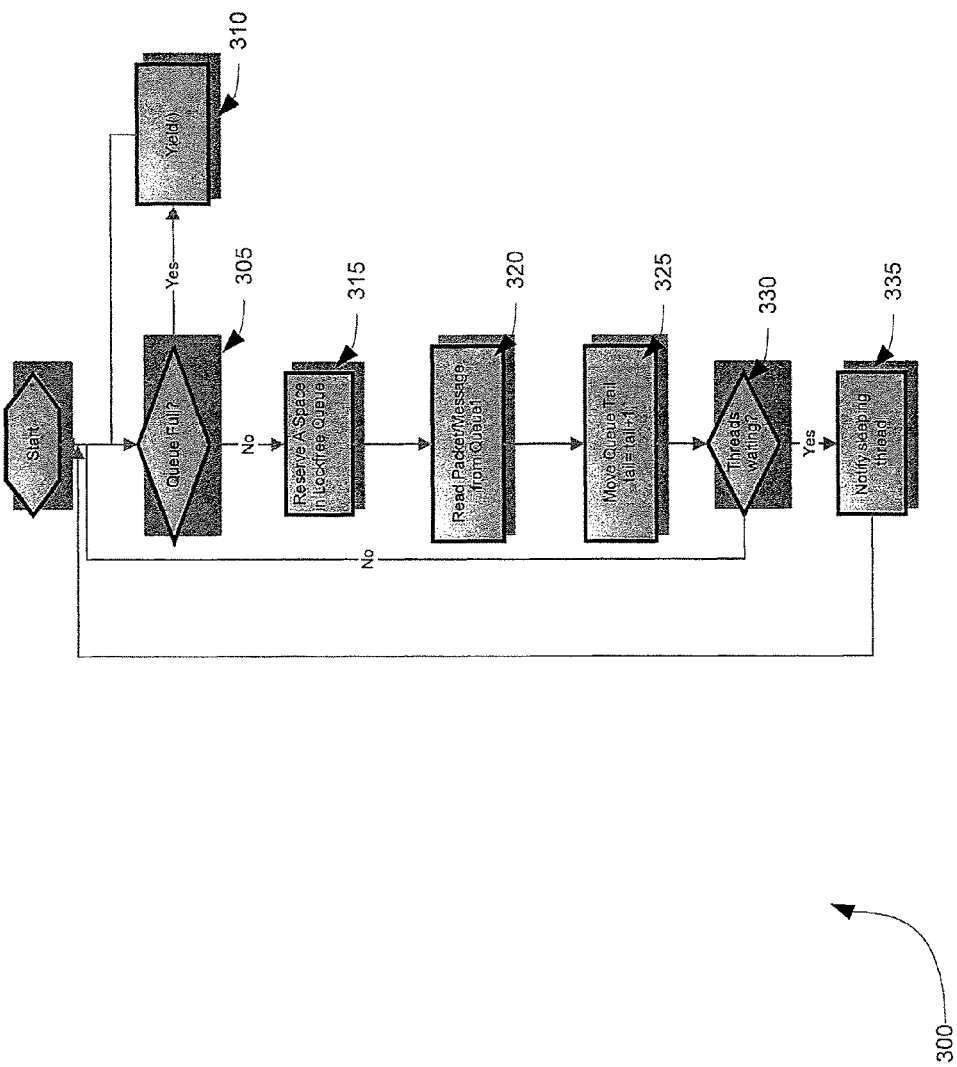
FIG. 3 shows a flowchart depicting a method of enqueing packets.

Referring now to FIG. 3, a method for enqueing packets into a queue is depicted in the form of a flowchart and indicated generally at 300. Method 300 can be performed by reader thread 82.

When performed by reader 82, step 305 of method 300 first verifies whether application 70 is busy enqueueing elements into queue 86. There is no delay if queue 86 is not full and queue 74 is not empty. When queue 74 is empty, reader 82 is configured to wait for a notification that queue 74 is not empty. When queue 86 is full, reader 82 is configured to advance to step 310 and yield current and keep trying to put packets from into queue 86. In a present embodiment there is no thread wait (i.e., a notifying or context switch) happening when queue 86 is full, based on a configuration of application 70 whereby at least some other threads (e.g., thread controller 90 or writer 84) are running fast enough to continuously try and dequeue elements from queue 86. ("Yield current" refers to a condition whereby the thread will keep retrying without waiting and/or locking. The only delay is the current thread yield to allow other threads get access to the central processing unit(s) (CPU) in order to continue processing. The delay is the time slice of thread switching.)

Reader 82 is configured to check if queue 86 is full before reading packets from queue 74. If queue 86 is full, reader 82 keeps yielding at step 310 to allow processor threads 94 and write thread 84 to dequeue packets until queue 86 is not full.

Reader 82 is configured to reserve a space (step 315), read packets (step 320) and move queue tail forward (step 325). (Note that such reserving at step 315 does not change value of TAIL itself, but a commit will move the TAIL forward.) Reader 82, in a present embodiment is configured so as to not need to do any memory copying or allocation to make reader 82 as fast as possible. This is effected by the fact that an intermediate buffer is not used to read packets from queue 74, so that there is no memory allocation or copying and the same memory will be reused by different threads.

At step 335, reader 82 is configured to notify those of threads 94 which are sleeping when a predefined condition, referred to herein as "Worker_waiting flag", is set to true. It is presently preferred that only maximum one process thread 94 on waiting mode at any time. The processor thread 94 is, in a present embodiment, configured to only go into waiting mode only when it is currently the only active process threads 94. Packets in process thread 94 are all processed and processor thread yielded for NoopTime times. ("NoopTime" refers to an empty loop, that does not do anything but yield the current thread. NoopTime still consumes CPU time to run empty loop. However, in order to prevent 100% CPU usage, a maximum Noop time is configured, thereafter After that, the thread will go to sleep mode. The benefit is that if there is incoming packets during Noop, it will be picked immediately for processing.

Figure 4:
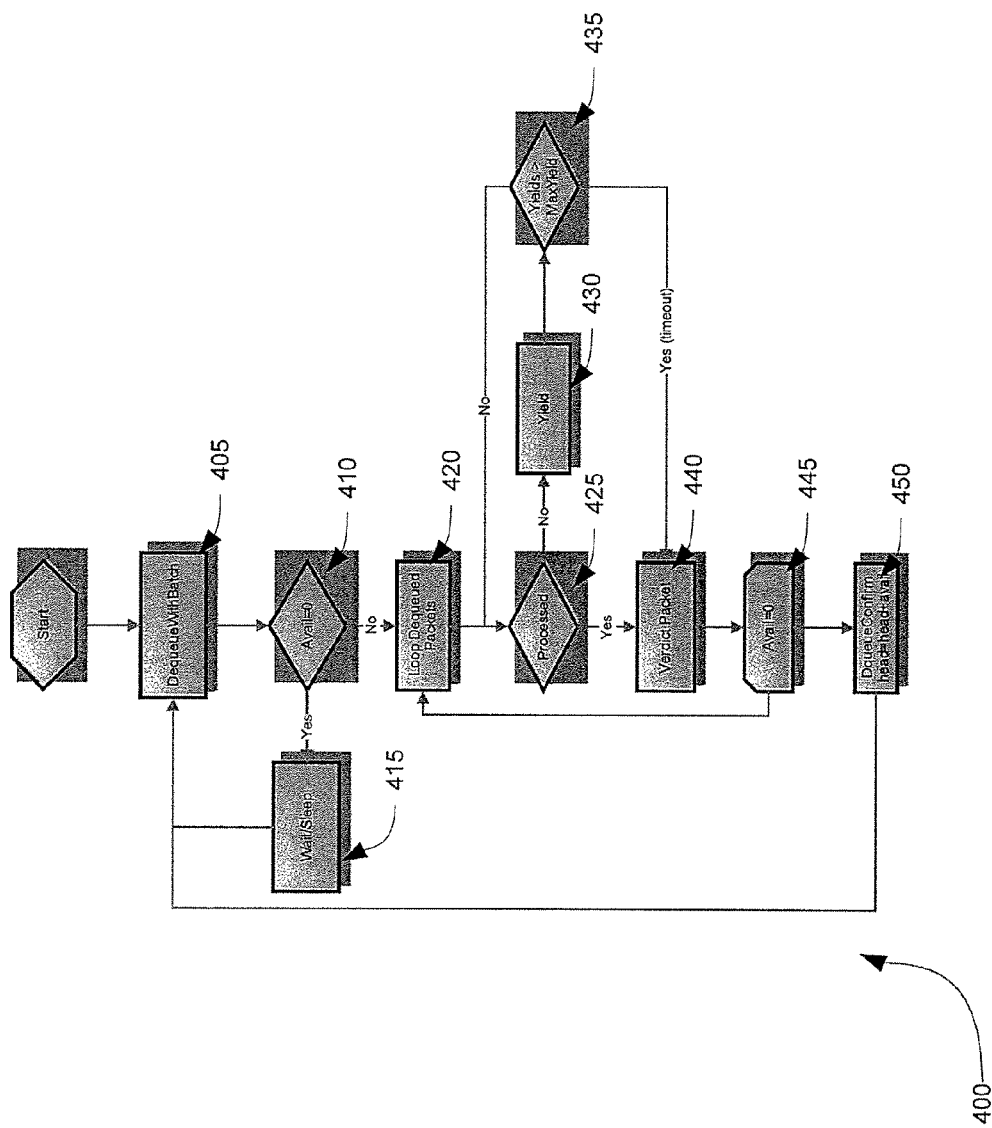
FIG. 4 shows a flowchart depicting a method of dequeing packets.

Referring now to FIG. 4, a method for dequeuing packets from one queue another queue is depicted in the form of a flowchart and indicated generally at 400. Method 400 can be performed by writer thread 84. (Writer thread 84 can also be described as a verdict thread.)

Writer thread 84 is configured to read packets from queue 86 and forward those packets to queue 78. Such forwarding from queue 86 will occur typically after a given packet is processed by a processor thread 94, but will also be forwarded in any event after a predefined time-out period in the event that a processor thread 94 does not process a particular packet within that that predefined time-out period. In the time-out scenario, in a present embodiment writer thread 84 will be configured to make an assumption about how that particular packet would have been processed. For example, in the "forward" or "drop" scenario of a telecommunication environment, writer thread 84 can be configured to assume that a particular packet was processed to be a "forward" packet.

In a present embodiment, writer thread 84 is configured to select a time-out period based on how many times thread 84 yields to determine when writer thread 84 should timeout. While use of an absolute time value for the time-out period is possible, it is presently preferred to avoid an absolute time value as the cost of even a loss of one nanosecond can be too great.

Writer thread 84 is configured so that after an attempt to read a packet by writer thread 84 from queue 86 results in writer thread 84 ascertaining that the packet that has not been processed, then writer thread 84 will assume that the packet will be processed in a very short time by processor thread 94. Thread 84 and 94 are configured to run concurrently and there is a plurality of threads 94 running concurrently. When thread 84 reads a packet and that has not been processed, then that packet It might be processed by thread 94 at the same time or it might be in queue 86 waiting for next the thread 94 to pick it up and process. Accordingly, it is assumed that the packet should be processed by thread 94 very soon. However, in the event that thread 94 is slow, and it takes long time to process packets in thread 94, then thread 84 will "time out" and ignore processed flag of the packet and continue.

In a present embodiment, application 70 is configured so that there is one writer thread 84 to correspond with the single reader thread 82. Such configuration is made so as to ensure that the writer thread 84 will dequeue from queue 86 in the same order that reader thread 82 enqueues into queue 86.

Writer thread 84 is configured to go into a wait/sleep mode if queue 86 is empty. Writer thread 84 will be notified when queue 86 becomes non-empty.

Writer thread 84 is also, in a present embodiment, configured to dequeue packets from queue 86 in a batch mode. In batch modes, a plurality of packets are dequeued from queue 86 rather than dequeuing each packet from queue 86 one at a time.

Step 405 of FIG. 4 represents the commencement of the steps of dequeuing, either one at a time or in batch mode, although as noted the batch mode is optional.

Step 410 of FIG. 4 represents the determination by writer thread 84 as to whether or not there are actually any packets that are available to be dequeued from queue 86.

Step 415 represents the wait or sleep state that writer thread 84 will assume if there are no packets available as determined at step 405.

Step 420 represents the commencement of a loop whereby packets are actually dequeued from queue 86. At step 425 a determination is made as to whether or not a particular packet in queue 86 has been processed. If no, then method 400 advances to step 430 where writer thread 84 yields. At step 435, if a maximum yield is not achieved then the method returns back to step 425. If at step 435 a maximum yield is achieved, then the yield times out and the method advances to step 440. Step 440 can also be reached directly upon a yes determination that a given packet in queue 86 has been processed at step 425. Note that if method 400 reaches step 440 via step 435, then writer thread 84 will make an assumption as to how the packet would have been processed. (e.g., writer thread 84 may assume that packets which have not been processed are all "forward" packets and none are "drop" packets.)

Thus, at step 440, however step 440 is reached; packet(s) are dequeued from queue 86 and actually placed in to queue 78, with a particular verdict (e.g., "forward" or "drop") attached thereto.

Step 445 represents a termination of the loop commenced at step 420, whereby the loop at step 420 will recommence until there are no longer any available packets to dequeue from queue 86.

At step 450, there is a Confirmation that packets are dequeued by moving WRITHEAD forward.

Figure 5:
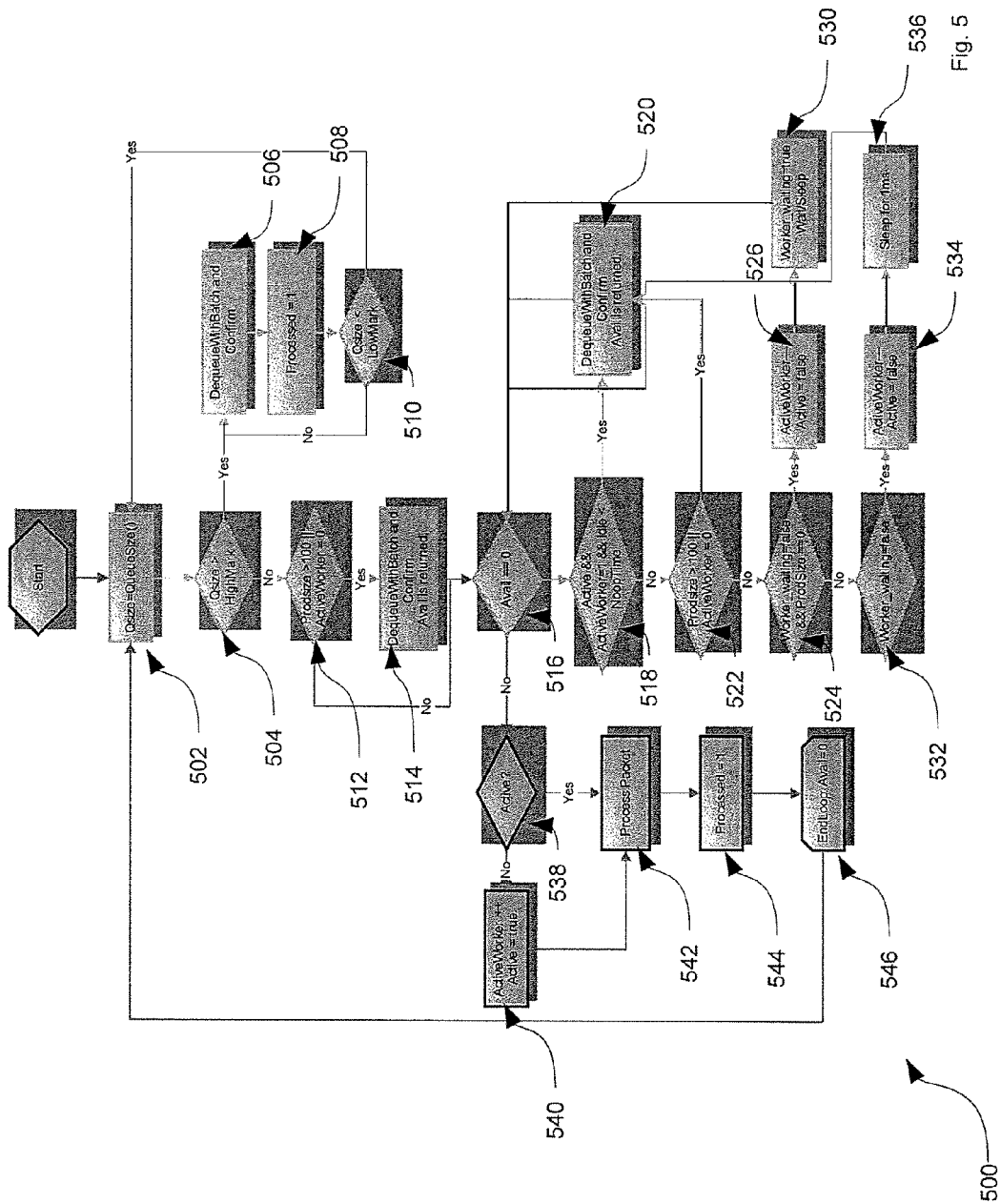
FIG. 5 shows a flowchart depicting a method of processing packets.

Referring now to FIG. 5, a method for processing packets within a queue such as queue 86 is depicted in the form of a flowchart and indicated generally at 500. Method 400 can be performed by threads 94 in conjunction with thread controller 90.

At step 502, the variable Qsize for thread controller 94 is set to the size of queue 86.

At step 504, at determination is made as to whether the size of the queue has exceeded a maximum value. If the determination at step 504 is 'yes', then method 500 advances to step 506 at which point a dequeue with batch is performed according to method 400. Thus, at step 506, process 94 will notify writer thread 84 to perform a dequeue with batch according to method 400. At step 508, a flag is set to indicate that a particular packet has been processed. Step 508 is the last step in thread 94 to indicate that packets is processed. Note, however, the processed flag could be set after normal processing, or it could be set if system is congested and packets are ignored without processing.

At step 510 it is determined whether sufficient dequeuing has occurred in order to bring the variable Qsize below a predefined minimum value. If yes, then method 500 advances from step 510 to step 502. If no, then method 500 cycles from step 510 back to step 506.

Returning to step 504, if a no determination is made then method 500 advances from step 504 to 512 at which point a determination is made as to whether there are any available processing ability from threads 94. Such a determination can be based on whether QSize is lower than low mark. Packets available for processing, activeWorkers and active flag are used to determine when thread 94 should go to sleep mode. This is a two step determination, where the first step is to use QSize to determine if system is too busy, and the second step is to determine how many thread 94 are required to process packets available in queue 86 or whether all of threads 94 are already engaged in processing.

If the determination at step 512 is yes then method 500 advances from step 512 to step 514 at which point a dequeue-with-batch is performed according to method 400. After step 514 method 500 advances to step 516 and AVAIL is returned.

If the determination at step 512 is no then method 500 advances directly to step 516 bypassing step 514.

At step 516 a determination is made ("AVAIL") as to how many packets returned from queue 86 and whether there are any available processor threads 94. For example, assume a batch size is one-hundred, and there are more than one-hundred packets available in queue 86. Accordingly, AVAIL will be one-hundred, and PRODSIZE will be more than one-hundred. (PRODSIZE means how many packets are available in queue 86 ready for processing. PRODSIZE differs from QSize which is how many packets are available in 86 ready for processing or verdicting). In this case, current thread 94 is not capable of processing all packets, and more threads 94 are needed to process all packets.

If at step 516 it is determined that there is no availability of processor threads 94 (i.e., Avail=0) then method 500 advances from step 516 to step 518.

At step 518 a determination is made which checks whether a current thread 94 is the only active thread processing packets and that particular thread 94 has not been idle for a defined period of time.

If the determination at step 518 is "yes" then method 500 advances from step 518 to step 520 then a dequeue with batch is performed according to method 400 and then method 500 advances from step 520 back to step 516.

If the determination at step 520 is "no" then method 500 advances from step 518 to step 522. At step 522 a determination is made based on the same conditions as previously described in relation to step 512.

If the determination at step 522 is "yes" then method 500 advances from step 522 to step 520 and step 520 is performed as previously discussed.

If the determination at step 522 is "no" then method 500 advances from step 522 to step 524. At step 524 a determination is made as to whether there are any more packets available in queue 86 for processing and current thread 94 is still active running. If yes, sleep mode is entered.

Also, if the determination at step 524 is "yes" then method 500 advances from step 524 to step 526 and the variable active worker status is set to false and then at step 528 the variable worker waiting is set to true. These settings are used during subsequent determinations made at step 518 and step 524 and 530. From step 530 method 500 cycles back to step 516.

If the determination at step 524 is "no" then method 500 advances from step 524 to step 532.

Returning now to step 516, If at step 516 it is determined that there are packets available for processing (i.e., Avail <>0) then method 500 advances from step 516 to step 538. At step 538 a determination is made as to whether a given processor thread 94 is active. If not, them method advances from step 538 to step 540 at which point the active worker variable is incremented and a flag is set that indicates the given processor thread 94 is now active.

Step 542 is either reached directly by a "yes" determination from step 538 or indirectly via step 540. However step 542 is reached, the actual processing of a given packet is performed at step 542 by the particular processor thread 94. Again, as described in the previous telecommunication example, the processing performed can be a determination as to whether a particular packet should be "dropped" or "forwarded" onto another network element for further processing. Thus processor thread 94 can interact with other telecommunication network elements, such as billing and/or subscription information associated with a particular subscriber in order to ascertain whether a particular packet should be "dropped" or "forwarded". Eventually, writer thread 84 will pass the packet and the particular verdict ("drop" or "forward" along to queue 78 at the appropriate time according to the teachings herein.

At step 544 a flag is set within queue 86 indicating that a particular packet has been processed. This flag is used at step 425 of method 400 as previously discussed.

At step 546 the loop that was commenced by step 516 is terminated and method 500 cycles back to step 502.

When application 70 is operating, packets can be processed without the need to lock queue 86. Reproduced below in various Tables are simple examples of how packets in queue 74 can be processed for eventual writing to queue 76 as they pass through queue 86.

TABLE I

Normal Packet processing without using queue batch mode.

| Sequence | Status of Queue 86 |
|---|---|
| 0<br>This is initial state. | Application 70 starts, queue 86 is initialized.<br>Queue Object. (Queue Capacity = 5)<br>Tail = 0    Queue is pre allocated.<br>ProcHead = 0    Processed = 0    0    0    0<br>WRITHEAD = 0 |
| 1<br>(Method 300) | Reader thread 82 reads three packets from Queue 74 and Enqueues them into queue 86.<br>Queue Object. (Queue Capacity = 5)<br>Tail = 3    Queue is pre allocated.<br>ProcHead = 0    Processed = 0    0    0    0<br>WRITHEAD = 0    Packet    Packet    Packet |
| 2<br>(Method 500)<br>*means packet is dequeued by procHead but that the packet has not been dequeued by WRITHEAD. | Process thread 94 start processing packets. Process thread 94 dequeues first packet from queue 86 and move procHead forward<br>Queue Object. (Queue Capacity = 5)<br>Tail = 3    Queue is pre allocated.<br>ProcHead = 1    Processed = 0    0    0    0<br>WRITHEAD = 0    Packet*    Packet    Packet |
| 3<br>Method 500 and step544 | Process thread 94 finishes processing packet, and processed is flag to 1.<br>Queue Object. (Queue Capacity = 5)<br>Tail = 3    Queue is pre allocated.<br>ProcHead = 1    Processed = 1    0    0    0<br>WRITHEAD = 0    Packet*    Packet    Packet |
| 4<br>Method 400<br>means packet is dequeued by WRITHEAD and it is forwarded to queue 78 | Writer thread 84 dequeues first packet from queue 86, and checks the processed flag. If processed flag is set to 1, the packet is verdicted by reading the packet from queue 86 and writing to queue 78 and WRITHEAD is moved forward.<br>Queue Object. (Queue Capacity = 5)<br>Tail = 3    Queue is pre allocated.<br>ProcHead = 1    Processed = 1    0    0    0<br>WRITHEAD = 1    Packet    Packet    Packet |
| 5 | Process thread 94 repeats steps 2, 3 and write thread 84 repeats step 4 for packet 2 and 3. Eventually, all packets will be processed.<br>Queue Object. (Queue Capacity = 5)<br>Tail = 3    Queue is pre allocated.<br>ProcHead = 3    Processed = 1    1    1    0<br>WRITHEAD = 3    Packet**    Packet**    Packet** |

TABLE II

Normal packet processing with batch mode. (batch size = 2).

| Sequence | Status of Queue 86 |
|---|---|
| 0 | Application 70 starts, queue 86 is initialized.<br>Queue Object. (Queue Capacity = 5)<br>Tail = 0    Queue is pre allocated.<br>ProcHead = 0    Processed = 0    0    0    0    0<br>WRITHEAD = 0 |
| 1<br>(Method 300) | Reader thread reads 3 packets from Queue 74 and Enqueues them into queue 86.<br>Queue Object. (Queue Capacity = 5)<br>Tail = 3    Queue is pre allocated.<br>ProcHead = 0    Processed = 0    0    0    0    0<br>WRITHEAD = 0    Packet    Packet    Packet |
| 2<br>(Method 500) | Process thread 94 starts processing packets. 2 packets are dequeued from queue 86.<br>Queue Object. (Queue Capacity = 5)<br>Tail = 3    Queue is pre allocated.<br>ProcHead = 2    Processed = 0    0    0    0    0<br>WRITHead = 0    Packet*    Packet*    Packet |
| 3<br>(Method 500 including step 544) | Process thread 94 finishes processing first packet, and processed flag is set to 1.<br>Queue Object. (Queue Capacity = 5)<br>Tail = 3    Queue is pre allocated.<br>ProcHead = 2    Processed = 1    0    0    0    0<br>WRITHEAD = 0    Packet*    Packet    Packet |
| 4<br>(Method 400 Packets are processed and verdicted.) | Write thread 84 dequeue first packet from queue, check processed flag. If it's set to 1, the packet is verdicted<br>Queue Object. (Queue Capacity = 5)<br>Tail = 3    Queue is pre allocated.<br>ProcHead = 2    Processed = 1    0    0    0    0<br>WRITHEAD = 0    Packet**    Packet    Packet |
| 5<br>(Method 500 including Step 544) | Process thread finished processing second packet, it set processed flag to 1.<br>Queue Object. (Queue Capacity = 5)<br>Tail = 3    Queue is pre allocated.<br>ProcHead = 2    Processed = 1    1    0    0    0<br>WRITHEAD = 0    Packet**    Packet*    Packet |
| 6<br>(Method 400) | Write thread 84 dequeue second packet from queue, check processed flag. If it's set to 1, the packet is verdicted<br>Queue Object. (Queue Capacity = 5)<br>Tail = 3    Queue is pre allocated.<br>ProcHead = 2    Processed = 1    1    0    0    0<br>WRITHEAD = 0    Packet**    Packet**    Packet |
| 7<br>(Method 400) | Verdict is moved forward by 2.<br>Queue Object. (Queue Capacity = 5)<br>Tail = 3    Queue is pre allocated.<br>ProcHead = 2    Processed = 1    1    0    0    0<br>WRITHEAD = 2    Packet**    Packet**    Packet |
| 8<br>(Method 500, 400) | Process thread will repeat same steps and write thread 84 will repeat same steps. Eventually, all packets will be processed.<br>Queue Object. (Queue Capacity = 5)<br>Tail = 3    Queue is pre allocated.<br>ProcHead = 3    Processed = 1    1    1    0    0<br>WRITHEAD = 3    Packet**    Packet**    Packet** |

TABLE III

Packet processing if verdict process dequeued packet before packet is processed

| Sequence | Status of Queue 86 |
|---|---|
| 0 | Application 70 starts, queue 86 is initialized.<br>Queue Object. (Queue Capacity = 5)<br>Tail = 0    Queue is pre allocated.<br>ProcHead = 0    Processed = 0    0    0    0    0<br>WRITHEAD = 0 |
| 1<br>(Method 300) | Reader thread 82 reads three packets from Queue 74 and Enqueue them into queue.<br>Queue Object. (Queue Capacity = 5)<br>Tail = 3    Queue is pre allocated.<br>ProcHead = 0    Processed = 0    0    0    0    0<br>WRITHEAD = 0    Packet    Packet    Packet |

TABLE III-continued

Packet processing if verdict process dequeued packet before packet is processed

| Sequence | Status of Queue 86 |
|---|---|
| 2 (Method 400) The packets is dequeued by write thread but it is waiting for processed flag. | Write thread 84 dequeue first packet from queue, check processed flag. It is set to 0, the packet won't be verdicted, the write thread 84 will yield until processed is set to 1.<br>Queue Object. (Queue Capacity = 5)<br>Tail = 3    Queue is pre allocated.<br>ProcHead = 0    Processed = 0    0    0    0    0<br>WRITHEAD = 0    Packet            Packet    Packet |
| 3 (Method 500) | Process thread 94 starts processing packets. It dequeues first packet from queue 86 and move procHead forward<br>Queue Object. (Queue Capacity = 5)<br>Tail = 3    Queue is pre allocated.<br>ProcHead = 1    Processed = 0    0    0    0    0<br>VertHead = 0    Packet*    Packet    Packet |
| 4 (Method 500) | Process thread 94 finishes processing packet, and processed flag is set to 1.<br>Queue Object. (Queue Capacity = 5)<br>Tail = 3    Queue is pre allocated.<br>ProcHead = 1    Processed = 1    0    0    0    0<br>WRITHEAD = 0    Packet*    Packet    Packet |
| 5 (Method 400) Packets is processed and verdicted. | Write thread 84 dequeues first packet from queue 86, check processed flag. If processed flag set to one, the packet is verdicted and WRITHEAD is moved forward.<br>Queue Object. (Queue Capacity = 5)<br>Tail = 3    Queue is pre allocated.<br>ProcHead = 1    Processed = 1    0    0    0    0<br>WRITHEAD = 1    Packet**    Packet    Packet |
| 6 (Method 400, 500) | Process thread 94 will repeat steps and write thread 84 will repeat steps for packet 2 and 3. Eventually, all packets will be processed.<br>Queue Object. (Queue Capacity = 5)<br>Tail = 3    Queue is pre allocated.<br>ProcHead = 3    Processed = 1    1    1    0    0<br>WRITHEAD = 3    Packet**    Packet**    Packet** |

TABLE IV

Packet processing times out if processor thread is not fast enough to process packet.

| Sequence | Status of Queue 86 |
|---|---|
| 0 | Application 70 starts, queue 86 is initialized.<br>Queue Object. (Queue Capacity = 5)<br>Tail = 0    Queue is pre allocated.<br>ProcHead = 0    Processed = 0    0    0    0    0<br>WRITHEAD = 0 |
| 1 (Method 300) | Reader thread read 3 packets from Queue 74 and Enqueue them into queue.<br>Queue Object. (Queue Capacity = 5)<br>Tail = 3    Queue is pre allocated.<br>ProcHead = 0    Processed = 0    0    0    0    0<br>WRITHEAD = 0    Packet            Packet    Packet |
| 2 (Method 400) | Write thread 84 dequeues first packet from queue 86, check processed flag. It is set to 0, the packet won't be verdicted, the write thread 84 keeps yield and eventually it timed out. (Yield times >= MaxYield).<br>Queue Object. (Queue Capacity = 5)<br>Tail = 3    Queue is pre allocated.<br>ProcHead = 0    Processed = 0    0    0    0    0<br>WRITHEAD = 0    Packet            Packet    Packet |
| 5 (Method 400) Packet timed out because processing thread 94 is too slow. Verdict thread set processed flag to 1 and | Write thread 84 set processed flag to true and WRITHEAD is moved forward.<br>Queue Object. (Queue Capacity = 5)<br>Tail = 3    Queue is pre allocated.<br>ProcHead = 0    Processed = 1    0    0    0    0<br>WRITHEAD = 1    Packet*        Packet    Packet |

TABLE IV-continued

Packet processing times out if processor thread is not fast enough to process packet.

| Sequence | Status of Queue 86 | | | | | |
|---|---|---|---|---|---|---|
| move WRITHEAD forward. | | | | | | |
| 6 (Method 500) The packet is processed later but the packets has already been forwarded to queue 78. | Later on, processor thread 94 dequeues first packet, processes the packet and move procHead forward, however, packet has already been verdicted already. Queue Object. (Queue Capacity = 5) | | | | | |
| | Tail = 3 | Queue is pre allocated. | | | | |
| | ProcHead = 1 | Processed = 1 | 0 | 0 | 0 | 0 |
| | WRITHEAD = 1 | Packet** | Packet | Packet | | |

While the foregoing provides certain embodiments, it is to be understood that such embodiments are merely exemplary and that variations, combinations and/or subsets thereof are contemplated.

The invention claimed is:

1. A computing device comprising:
a central processing unit interconnected with a random access memory and a read only memory by a bus;
said central processing unit configured to execute a plurality of programming instructions representing a plurality of software objects comprising a read queue for storing unprocessed packets originating from a mobile handset and destined for a destination server, and a write queue for storing processed packets;
said software objects including a reader thread for reading said unprocessed packets from said read queue and a lock free queue for receiving every one of said unprocessed packets via said reader thread if said lock free queue is not full;
said software objects including at least one processor thread for performing an operation on at least one of said unprocessed packets in said lock free queue, said operation including:
determining a type of service associated with said one unprocessed packet;
determining, based on said type of service, whether said one unprocessed packet is authorized according to an agreement with a subscriber operating said mobile handset, said agreement indicating that certain services are permitted while other services are not permitted;
when said one unprocessed packet is determined to be authorized, indicating that said one unprocessed packet should be forwarded for delivery to said destination server; and
when said one unprocessed packet is not authorized, indicating that said one unprocessed packet should be dropped;
said at least one processor thread configured, following the performance of said operation, to set a flag in said lock free queue indicating that said unprocessed packet has been processed;
said software objects further including a writer thread for dequeueing said processed packets from said lock free queue and enqueueing said processed packets to said write queue, said writer thread further configured to write said indication of said operation into said write queue; and
said software objects further including a timer, said writer thread configured, when said at least one processor thread fails to process said one unprocessed packet according to a defined time-out criterion, to assume that said indication of said operation is that said one unprocessed packet should be forwarded, and to enqueue said one unprocessed packet to said write queue for delivery to said destination server.

2. In a computing device having a central processing unit, random access memory, and read only memory interconnected by a bus, said central processing unit configured to execute a plurality of programming instructions representing a plurality of software objects comprising a read queue for storing unprocessed packets, a write queue for storing processed packets, and a timer having a defined time-out criterion; a method for processing said unprocessed packets comprising:
storing said unprocessed packets in said read queue, said unprocessed packets originating from a mobile handset and destined for a destination server;
reading, via a reader thread, said unprocessed packets from said read queue and for every one of said unprocessed packets from said read queue, enqueuing said unprocessed packets in a lock free queue if said lock free queue is not full;
performing an operation on at least one of said unprocessed packets in said lock free queue via at least one processor thread, said operation including:
determining a type of service associated with said one unprocessed packet;
determining, based on said type of service, whether said one unprocessed packet is authorized according to an agreement with a subscriber operating said mobile handset, said agreement indicating that certain services are permitted while other services are not permitted;
when said one unprocessed packet is determined to be authorized, indicating that said one unprocessed packet should be forwarded for delivery to said destination server; and
when said one unprocessed packet is not authorized, indicating that said one unprocessed packet should be dropped;
following the performance of said operation, setting a flag in said lock free queue indicating that said at least one unprocessed packet has been processed;
dequeueing, via a writer thread, processed packets from said lock free queue and enqueueing said processed packets to said write queue;

writing, via said writer thread, said indication of said operation into said write queue; and when said at least one processor thread fails to process said one unprocessed packet according to said defined time-out criterion, assuming that said indication of said operation is that said one unprocessed packet should be forwarded, and enqueuing said one unprocessed packet to said write queue for delivery to said destination server.

\* \* \* \* \*